United States Patent [19]

Tsay

[11] Patent Number: 5,161,755

[45] Date of Patent: Nov. 10, 1992

[54] REINFORCED LIFE PARACHUTE

[76] Inventor: Ing-Lang Tsay, P.O. Box 10780, Taipei, Taiwan

[21] Appl. No.: 733,150

[22] Filed: Jul. 19, 1991

[51] Int. Cl.$^5$ ............................................. B64D 17/72
[52] U.S. Cl. ...................................... 244/146; 244/149
[58] Field of Search ........................ 244/146, 145, 149

[56] References Cited

U.S. PATENT DOCUMENTS

| | | | |
|---|---|---|---|
| 4,105,173 | 8/1978 | Bücker | 244/146 |
| 4,257,568 | 3/1981 | Bücker | 244/146 |
| 4,562,981 | 1/1986 | Smith et al. | 244/146 |
| 5,028,018 | 7/1991 | Krebber | 244/146 |

FOREIGN PATENT DOCUMENTS

| | | | |
|---|---|---|---|
| 0411222 | 2/1991 | European Pat. Off. | 244/146 |
| 1111950 | 7/1961 | Fed. Rep. of Germany | 244/146 |
| 1064014 | 5/1954 | France | 244/146 |
| 1129226 | 1/1957 | France | 244/146 |

*Primary Examiner*—Charles A. Marmor
*Assistant Examiner*—Carla Mattix

[57] ABSTRACT

A life parachute including a canopy formed of pieces of fabric sewed together, sheaths extending from the center of the canopy in a spoke-wise manner, and an inflatable envelope connected to a compressed gas container by way of a conduit. The inflatable envelope has a main body in the center thereof and legs extending spoke-wisely from the periphery of the main body; the legs and the main body are interconnected and inflatable. The number of legs is equal to that of the sheaths. The free ends of the legs are inserted into the corresponding sheaths and then secured onto the canopy so that the main body of the inflatable envelope can be maintained at the central portion of the canopy.

10 Claims, 4 Drawing Sheets

REINFORCED LIFE PARACHUTE

FIELD OF THE INVENTION

The present invention relates generally to a life parachute, and particularly an improved life parachute suitable for low altitude jumping.

BACKGROUND OF THE INVENTION

Various known parachutes are disclosed in a number of patent documents, including U.S. Pat. Nos. 1,705,909, 4,105,173, 4,257,568, 4,562,981, 4,634,080, and 5,028,018, and French patent document Nos. 1,064,014 and 1,129,226. In addition, there is also an allowed Taiwanese patent application No. 77206727 by the inventor of the present invention, and for which invention a U.S. patent application Ser. No. 07/238,839 was filed on Aug. 31, 1988, now abandoned.

In U.S. Pat. No. 4,105,173, Bucker discloses an inflatable parachute comprising a canopy with a hole in the center; flexible conduits; gas container inflation; legs distributed under the canopy in a spoke-wise manner and capable of inflation; an envelope; and a jacket attached to the parachute's lines.

However, Bucker does not solve the problem of connecting the canopy and the conduits, and the solution to this problem is of utmost importance. It can even be said that whether a parachute can truly become a useful product depends on how this problem is solved. Obviously, the canopy and the conduits cannot be made of the same material and they must be manufactured separately and then joined together, and in the process of joining, there must not be too many holes made by the stitches, because even though these holes are very tiny, they may cause the canopy to split under atmospheric pressure during use.

In French patent document No. 1,129,226, Luceber provides an idea for solving the drawback in Bucker's invention. Luceber teaches a sheath arrangement wherein the sheaths cover the inflatable legs under the canopy, as shown in FIG. 3 of Luceber's application.

However, Luceber provides only a conception for connecting the canopy and the legs. Luceber does not give a detailed illustration of a possible construction. How the canopy and the legs, after being manufactured separately, are connected by means of the sheaths and how the canopy and the legs are disengaged after connection cannot be understood from Luceber's disclosure. Therefore, in reality, Luceber has not solved the problem of joining the canopy and the legs in a fast and efficient manner. As a matter of fact, it is not the object of Luceber's invention to solve this problem.

SUMMARY OF THE INVENTION

A main object of the present invention is to provide a reinforced life parachute, wherein the inflatable envelope is separable from the canopy; that is, the envelope and the canopy can be made separately and then assembled. Hence, the canopy and the envelope may be made of different materials and in different ways; consequently, production of the parachutes according to the present invention is comparatively faster and easier than conventional parachutes, and in addition, splitting of the canopy during use can be effectively prevented.

It is another object of the present invention to provide a reinforced life parachute, wherein entanglement of the suspension ropes during use is eliminated.

It is a further object of the present invention to provide a reinforced life parachute, wherein the inflatable envelope will not be scraped easily.

It is still a further object of the present invention to provide a reinforced life parachute, wherein the canopy can be opened quickly and fully.

BRIEF DESCRIPTION OF THE DRAWINGS

The foregoing and other features and advantages of the present invention will be more clearly understood from the following detailed description and the accompanying drawings, in which.

DETAILED DESCRIPTION OF THE PREFERRED EMBODIMENTS

Figure 1:
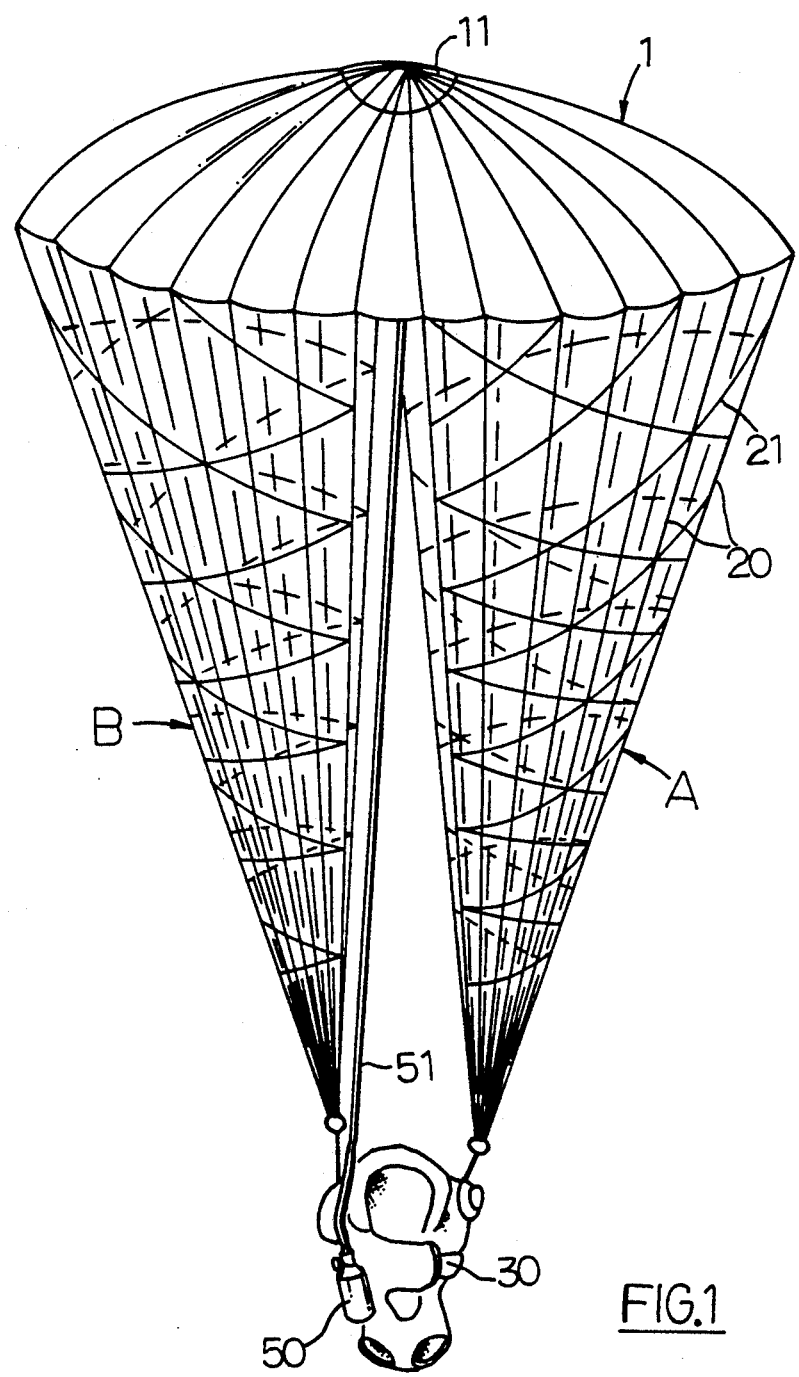
FIG. 1 is a perspective view of a reinforced life parachute embodying the present invention.

Before going into detailed description of the preferred embodiments of the present invention, definitions of the jargons used herein are given below:

(1) Sheaths 12

Sheaths 12 are connecting devices to be fixed onto the outside or the inside of the canopy, preferably a tubular structure having two open ends, or it may be a tubular structure with one end blocked and one end open. These connecting devices secure the inflatable envelope to the canopy, and whether the number of sheaths is odd or even, they are arranged spoke-wisely from the center of the canopy.

(2) Inflatable envelope 40

The envelope 40 is secured onto the outside or the inside of the canopy (by whatever method) and has a main body 41 and a multiplicity of legs 42 extending from the periphery of the main body 41 in a spoke-wise manner forming free ends. The envelope 40 is in communication with an inflatable conduit 51.

(3) Main body 41 of the inflatable envelope 40

When assembled, the main body 41 is disposed at the center of the canopy. It may be an annular or a triangular tubular structure, or it may be a disc-like or triangular gusset structure, or even a polygonal structure. The main body 41 is the central portion of the inflatable envelope 40 and may have a central hole, if desired.

(4) Canopy 1

The canopy 1 is formed of pieces of fabric 10 sewed together and is the major component of the life parachute; it may also have a central hole if desired.

Since the main concern of the present invention is to improve the canopy, inflatable envelope and suspension ropes of conventional parachutes, the structure of the jacket and the inflation mechanism will not be described in detail herein.

Figure 2:
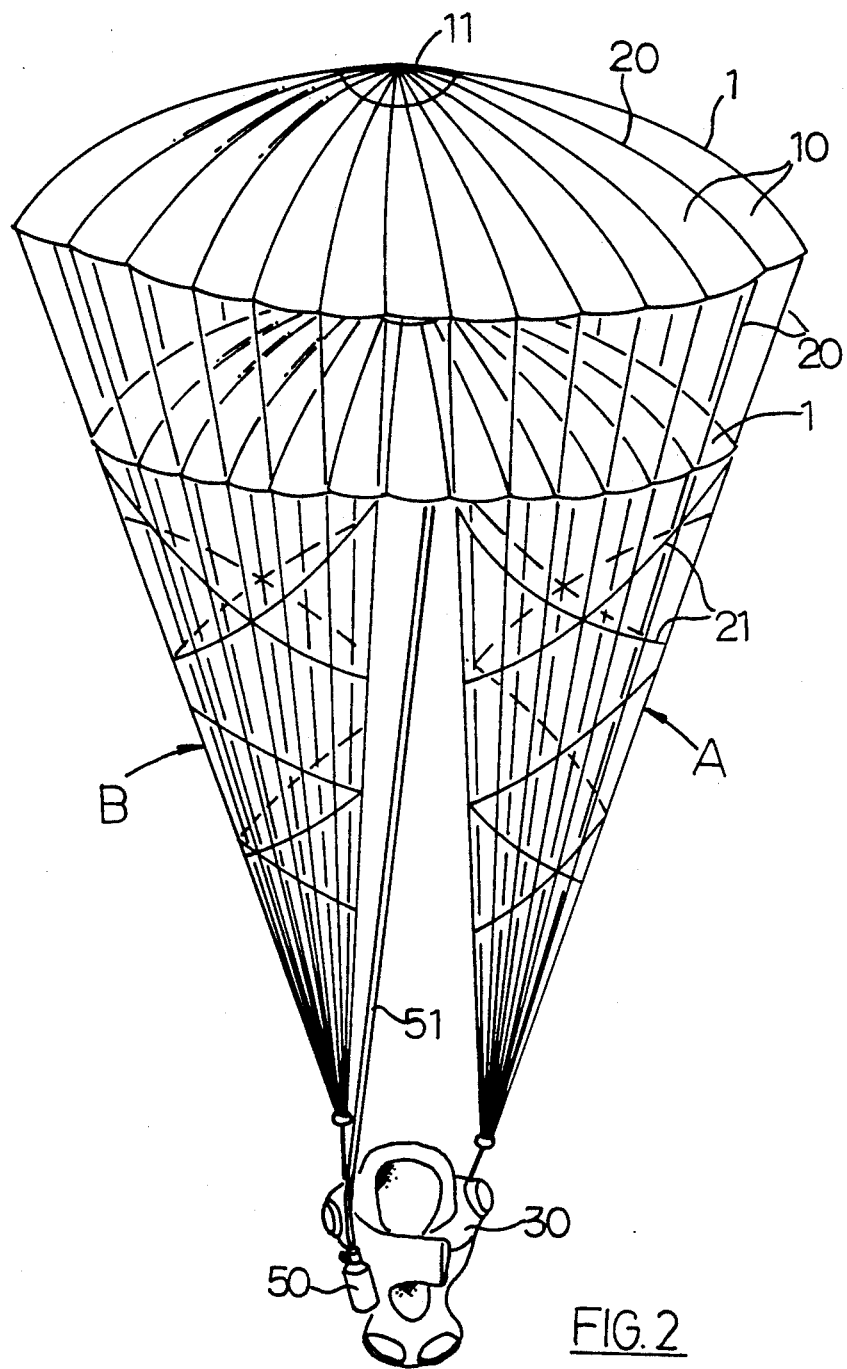
FIG. 2 is a perspective view of another embodiment of the present invention, showing that the present invention is suitable for various multi-layered parachutes.
Figure 3:
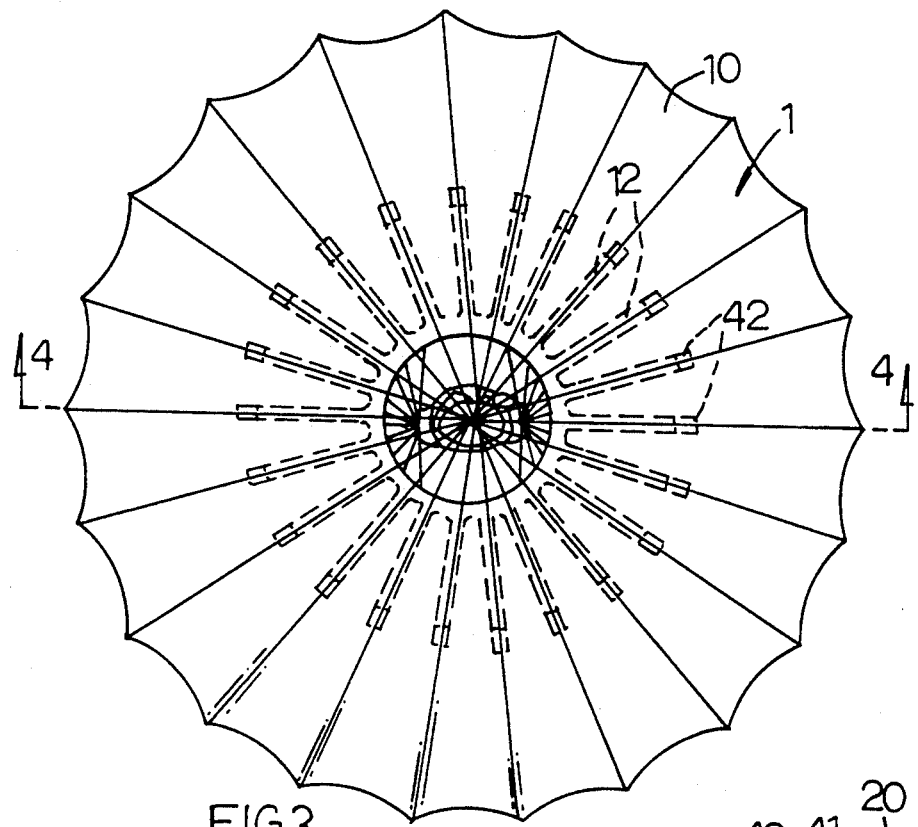
FIG. 3 is a top view of the embodiment of the present invention.

FIG. 2 shows a multi-layered parachute which applies the structure shown in FIG. 1, only that the single-layered parachute is modified to be multi-layered. Observe any one layer of the multi-layered parachute shown in FIG. 2, it can be seen that it is the same as the typical canopy structure shown in FIG. 1; therefore, in the following illustration, reference is chiefly made to the preferred embodiment shown in FIG. 1.

Referring now to FIGS. 1, 3, 4, and 5, the canopy 1 of the present invention is formed by multiple pieces of fabric 10 sewed together. A suspension rope 20 is provided along the seam between two pieces of fabric 10 and each suspension rope 20 passes through the apex of the canopy 1 so that the ropes 20 are distributed spoke-wisely from the apex of the canopy 1.

The suspension ropes 20 are substantially divided into 2 groups, A and B, and are respectively tied at their ends and fastened onto the jacket 30. In each group, lines 21 are obliquely woven in between the ropes 20, forming a network structure, which can prevent the ropes 20 from getting entangled when opening, folding, or operating the parachute, hence eliminating the defect of easy entanglement in conventional parachutes.

Figure 4:
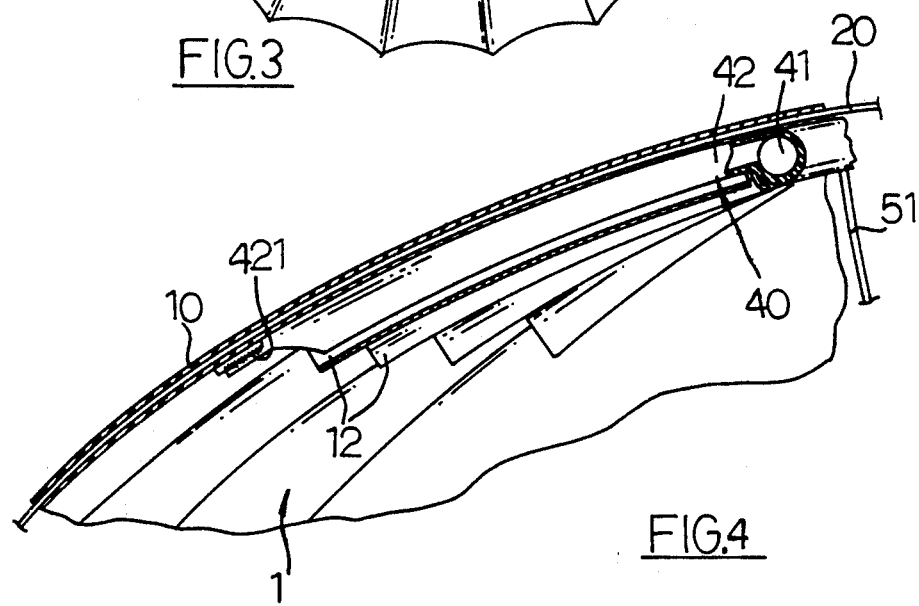
FIG. 4 is a partly cross-sectional view taken along line 4—4 of FIG. 3.
Figure 5:
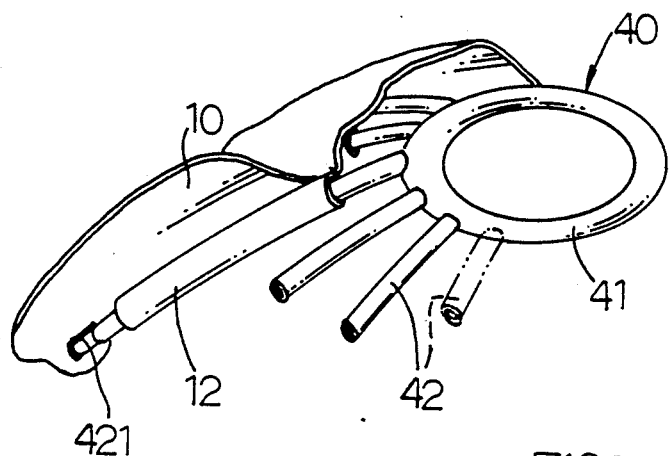
FIG. 5 is a partial perspective view of the embodiment of the present invention, showing the canopy, sheaths and inflatable envelope in an assembled condition.

FIGS. 4 and 5 show the interior of the canopy 1. Along each suspension rope 20 disposed on the canopy 1 a sheath 12 is provided. The number of sheaths 12 should be at least the same as that of the legs 42 (to be discussed hereinafter) of the inflatable envelope 40. All the sheaths 12 are distributed spoke-wisely from the center of the canopy 1. Preferably, the sheaths 12 are made of flexible material.

In order that the life parachute may fall as perpendicularly and stably as possible, a central hole 11 may be provided in the center of the canopy 1, and the suspension ropes 20 may be made to pass through the central opening 11 and then along the seams of the canopy 1.

FIGS. 4 and 5 show the inflatable envelope 40. The envelope 40 is separable from the canopy 1 and has a main body 41. If the canopy 1 has a central hole 11, then the main body 41 should also have a central opening, and the diameter thereof should be greater than the diameter of the central hole 11 so as to avoid obstructing ventilation. Preferably, the number of legs 42 extending spoke-wisely from the periphery of the main body 41 is the same as that of the sheaths 12. It is also preferred that the diameter of the legs 42 is smaller than the internal diameter of the sheaths 12 and that the length of the legs 42 is longer than that of the sheaths 12. The main body 41 is in communication with the air chamber of each leg 42, and the conduit 51 connects the main body 41 to the compressed gas container 50. When the valve of the compressed gas container 50 is opened, gas can pass through the conduit 51 into the inflatable envelope 40.

Since the envelope 40 is flexible, once being inflated, the legs 42 at the periphery of the main body 41 will prop up. The free ends of the legs 42 are pre-inserted into the corresponding sheaths 12 before use. Therefore, once the envelope 40 is inflated and the legs 42 prop up, the canopy 1 is opened immediately.

To prevent the legs 42 of the envelope 40 from slipping out of the sheaths 12, adhesive means may be provided at the end portions 421 of the legs 42 to secure the legs 42 onto the canopy 1, or cords may be used to fasten the legs 42 onto the canopy 1. In brief, any means of attachment may be used to fasten the envelope 40 onto the canopy 1.

In the above-described preferred embodiments, the envelope 40 and the sheaths 12 are provided under the canopy, but it is also possible to have the envelope 40 and sheaths 12 disposed on the outside of the canopy 1.

The life parachute according to the present invention presents 3 main advantages over conventional parachutes. First, if the inflatable envelope 40 is disposed under the canopy 1 to support the canopy 1, the canopy 1 can act as a protective cover for the envelope 40, eliminating the possibility of scraping the envelope 40 during production, packing, transportation or operation as in conventional parachutes wherein the envelope is a part of the canopy.

Second, the envelope 40 of the present invention is replaceable if it leaks. But in conventional parachutes, once the envelope leaks, the whole parachute has to be discarded.

Third, according to the present invention, the length of the legs 42 of the envelope 40 does not have to be the same as that of the canopy 1; so long as they can support the central portion of the canopy 1, the legs 42 may be half the length of the canopy 1. This design can not only save the material used to manufacture the envelope 40 but also save the amount of compressed gas used to open the canopy 1. In addition, the envelope 40 can be inflated much more quickly; hence, even when jumping from low heights, the life parachute according to the present invention can be opened quickly and fully.

Although the present invention has been illustrated and described with reference to the preferred embodiments thereof, it should be understood that it is in no way limited to the details of such embodiments, but is capable of numerous modifications within the scope of the appended claims.

I claim:

1. A reinforced life parachute comprising a canopy formed of multiple pieces of fabric sewed together; a jacket connected to said canopy by a multiplicity of suspension ropes; an inflatable envelope having a main body and a multiplicity of legs extending spoke-wisely from the periphery of said main body to form free ends; a conduit having a first end and a second end and connected to said inflatable envelope; a compressed gas container connected to the second end of said conduit; and a multiplicity of sheaths secured onto said canopy along the direction of said suspension ropes, the number of sheaths being at least the same as the number of said legs of said inflatable envelope, wherein said free ends of said legs are inserted into corresponding sheaths.

2. A reinforced life parachute as claimed in claim 1, wherein the number of said sheaths is the same as that of said legs.

3. A reinforced life parachute as claimed in claim 1, wherein the internal diameter of said sheaths is greater than the diameter of said legs.

4. A reinforced life parachute as claimed in claim 1, wherein the length of said sheaths is shorter than that of said legs.

5. A reinforced life parachute as claimed in claim 1, wherein a hole is provided in the center of said canopy.

6. A reinforced life parachute as claimed in claim 1, wherein a multiplicity of lines are obliquely woven in between said suspension ropes to form groups of network structures.

7. A reinforced life parachute as claimed in claim 1, wherein said canopy is a multi-layered structure.

8. A reinforced life parachute as claimed in claim 1, wherein said sheaths are formed of flexible material.

9. A reinforced life parachute as claimed in claim 5, wherein said main body of said inflatable envelope has a central hole, the diameter of said hole being greater than that of said hole in the center of said canopy.

10. A reinforced life parachute as claimed in claim 4, wherein said free ends of said legs pass through said sheaths and are then secured onto said canopy.

* * * * *